United States Patent [19]
Madhavan

[11] Patent Number: 6,004,017
[45] Date of Patent: *Dec. 21, 1999

[54] TEAGER-BASED METHOD AND SYSTEM FOR PREDICTING LIMIT CYCLE OSCILLATIONS AND CONTROL METHOD AND SYSTEM UTILIZING SAME

[76] Inventor: Poovanpilli G. Madhavan, 3347 Landings Dr., Ann Arbor, Mich. 48103

[*] Notice: This patent is subject to a terminal disclaimer.

[21] Appl. No.: 08/848,316

[22] Filed: Apr. 30, 1997

Related U.S. Application Data

[63] Continuation-in-part of application No. 08/745,014, Nov. 7, 1996, Pat. No. 5,784,273
[60] Provisional application No. 60/037,577, Feb. 10, 1997.

[51] Int. Cl.$^6$ .................................................. H03D 13/00
[52] U.S. Cl. .................... 364/176; 364/152; 364/474.17; 364/148.09; 364/160; 702/56; 702/182; 701/29
[58] Field of Search ................................. 364/270.3, 157, 364/162, 271, 724.1, 176, 152, 474.17, 148.09; 702/56

[56] References Cited

U.S. PATENT DOCUMENTS

| | | |
|---|---|---|
| 3,701,889 | 10/1972 | Barron et al. .......................... 235/151.1 |
| 4,559,600 | 12/1985 | Rao . |
| 4,604,834 | 8/1986 | Thompson . |
| 4,636,779 | 1/1987 | Thomas et al. . |
| 4,642,617 | 2/1987 | Thomas et al. . |
| 4,744,242 | 5/1988 | Anderson et al. . |
| 4,754,391 | 6/1988 | Suzuki ..................................... 364/157 |
| 4,759,243 | 7/1988 | Thompson . |
| 4,845,707 | 7/1989 | Isaacson et al. ......................... 370/69.1 |
| 4,849,741 | 7/1989 | Thomas . |
| 4,918,427 | 4/1990 | Thomas et al. . |
| 4,926,309 | 5/1990 | Wu et al. . |
| 4,980,844 | 12/1990 | Demjanenko et al. . |
| 5,115,671 | 5/1992 | Hicho . |
| 5,170,358 | 12/1992 | Delio . |
| 5,222,239 | 6/1993 | Rosch ................................ 395/750.04 |
| 5,407,265 | 4/1995 | Hamidieh et al. . |
| 5,453,925 | 9/1995 | Wojsznis et al. ........................ 364/157 |
| 5,473,533 | 12/1995 | Mengelt .................................. 364/152 |
| 5,489,984 | 2/1996 | Hariharan et al. ...................... 356/360 |
| 5,495,408 | 2/1996 | Caldwell ................................. 364/153 |
| 5,574,639 | 11/1996 | Qian et al. ........................ 364/724.011 |
| 5,579,232 | 11/1996 | Tong et al. .......................... 364/474.17 |
| 5,744,723 | 4/1998 | Piety ......................................... 73/660 |
| 5,784,273 | 7/1998 | Madhavan .............................. 364/176 |
| 5,847,658 | 12/1998 | Irie et al. ................................ 340/683 |

OTHER PUBLICATIONS

"Signature Analysis Methods and Applications for Rotating Machines", S.G. Braun & B. Seth, American Society of Mechcanical Engineers, Aug. 1978, pp. 1–8.

"On the Extraction and Filtering of Signals Acquired from Rotating Machines", S.G. Braun & B.B. Seth, Journal of Sound & Vibration (1979) 65(1), pp. 37–50.

"Stability of Nonlinear Systems", Prof. Derek P. Atherton, Research Studies Press, 1981, pp. 28–29.

"Signature Analysis Applied to Drilling", S. Braun, E. Lenz & C.L. Wu, Design Engineer Technical Conference, Sep. 20–23–1981, pp. 2–9.

(List continued on next page.)

*Primary Examiner*—William Grant
*Assistant Examiner*—Iván Calcaño
*Attorney, Agent, or Firm*—Brooks & Kushman P.C.

[57] ABSTRACT

A data-driven method and system are provided for predicting limit cycle oscillations such as chatter to obtain a classifier signal which, in turn, may be utilized by a control method and system. The method and system utilize newly-developed algorithms based on Teager algorithm which are applied to "vibration" data to predict when chatter phenomenon may emerge during an ongoing machining process. Using real data from a turning operation on a lathe, the onset of chatter can be predicted so that sufficient time is available to deploy an automatic control strategy such as reduction or random variation of spindle speed to quench the "chatter". The method and system preferably use the generalized Teager measure.

16 Claims, 5 Drawing Sheets

OTHER PUBLICATIONS

"An On–Line Method of Determining Tool Wear by Time–Domain Analysis", SME Technical Paper MR82–901, 1982, pp. 1–6.

"In–Process Detection of Tool Breakage by Monitoring the Spindle Motor Current of a Machine Tool", K. Matsushima, P. Bertok & T. Sata, ASME Winter–Annual Meeting 1982.

"On the Use of Drill–Up for on–Line Determination of Drill Wear", SMES, Technical Paper MS84–914, 1984, pp. 1–12.

"Computer–Assisted Prediction of Drill Failure Using In–Process Measurement of Thrust Force", A. Thangaraj & P.K. Wright, ASME Winter Annual Meeting–1986, pp. 303–322.

"Machining Chatter Suppression by Means of Spindle Speed Variation", Halyan Zhang, Jun Ni & Hanmin Shi, S.M. Wu Symposium, vol. 1, 1994, pp. 161–175.

"Linear Discriminant Function Analysis of Acoustic Emission Signals for Cutting Tool Monitoring", E.Kannatey-Asibu & E.Emel, Mechanical Signal Processing,1987 I4, 33–347.

"Mechanical Signature Analysis in Interrupted Cutting", J. Rotberg, E. Lenz, S. Braun, Annals of the CIRP, vol. 36/1/1987, pp. 249–252.

"Milling Cutter Breakage Sensing", CIRP Annals, 37/1/1988, pp. 45–51.

"Tool Break Detection by Monitoring Ultrasonic Vibrations", S.R. Hayashi, C.E. Thomas, D.G. Wildes, GE Corporate Research & Development, Jan. 18, 1988.

"In–Process Detection of Tool Failure in Milling Using Cutting Force Models", Y. Altinas & I. Yellowley, Journal of Engineering for Industry, May 1989, vol. 111/149.

"On–Line Monitoring of Tool and Cutting Conditions in Milling", J.H. Tarn & M. Tomizuka, Transactions of the ASME, vol. 111, Aug. 1990, pp. 206–212.

"Improved Methods for the Prediction of Chatter in Turning, Part 1: Determination of Structural Response Parameters", Minis, I.E., Nagrab, E.B. & Pandelidis, I.O. Transactions of the ASME, vol. 112, Feb. 1990, pp. 12–35.

"Vibration–Based Drill Wear Monitoring", J. Rotberg, E. Lenz & S. Braun, AMME, 1990, pp. 60–65.

"Recognition of Chatter with Neural Networks", J.N. Tansel, A. Wagiman & A. Tziranis, Int.J. Mach. Tools Manufact. vol. 31, No. 4, pp. 539–552, 1991.

"Nonlinear Dynamics and Chaos", Steven H. Strogatz, Addison–Wesley Publishing Co. pp. 196–197.

"On–Line Cutting State Recognition in Turning Using a Neural Network", M. Rahman, Q. Zhou, G.S. Hong, Int. J. Adv. Manuf. Technol. (1995) 10:87–92.

ATAM System Brochure, IRD Mechanalysis, Form 2290B.

"Random Fields: Analysis and Synthesis", Erik Vanmarcke, Chapter 5, pp. 185–233.

"Kalman Filtering and Time Frequency Distribution of Random Signals", P.G. Madhavan and W.J. Williams, Society of Photo–Optical Instrumentation Engineers Conf. 1996.

"Improved Methods for the Prediction of Chattern on Turning, Part 3: A Generalized Linear Theory", I.E. Minis et al., Transactions of ASME, vol. 112, Feb. 1990, pp. 28–35.

Fig. 6

TEAGER-BASED METHOD AND SYSTEM FOR PREDICTING LIMIT CYCLE OSCILLATIONS AND CONTROL METHOD AND SYSTEM UTILIZING SAME

CROSS-REFERENCE TO RELATED APPLICATIONS

This application is a continuation-in-part U.S. patent application Ser. No. 08/745,014, filed Nov. 7, 1996, entitled "Method and System for Predicting Limit Cycle Oscillations and Control Method and System Utilizing Same", now U.S. Pat. No. 5,784,273, which is hereby incorporated in its entirety by reference herein, and provisional application Ser. No. 60/037,577, entitled "Limit Cycle Prediction Using Generalized Teager Measure", filed Feb. 10, 1997.

TECHNICAL FIELD

This invention relates to methods and systems for predicting limit cycle oscillations and control methods and systems utilizing such predictions.

BACKGROUND ART

Limit cycle oscillations arise in many natural systems such as machine tool, brain electrical signals, return on stock, electrocardiogram, earthquake, vibrations of mechanical structures (such as bridges, airplane wings, automobile engines and suspensions among others) and communication networks, for example.

Chatter, a type of limit cycle oscillation, is a self-excited relative vibration between the workpiece and the cutting tool in common machining processes such as turning process on a lathe as described in Zhang, H., Ni, J. and Shi, H., "Machining Chatter Suppression by Means of Spindle Speed Variation", PROC. S.M. WU SYMPOSIUM, Vol. 1, pp. 161–175, 1994.

The development of chatter causes a machining process to become unstable. This can result in poor surface finish, accuracy and reduced tool and other machine part life. Having to control machine tool chatter after it arises by traditional means such as by reducing spindle speed restricts the amount of material that can be removed in a turning process, for example. Therefore, development of chatter in a machining process reduces productivity and quality.

The three major approaches to chatter prediction are described in Minis, I. E., Magrab, E. B. and Pandelidis, I. O., "Improved Methods for the Prediction of Chatter in Turning, Part 3: A Generalized Linear Theory", *ASME Journal of Engineering for Industry*, vol. 112, pp. 28–35, 1990; Tansel, I. N. et. al, "Recognition of Chatter With Neural Networks," INT. J. MACH. TOOLS MANUFACT., vol. 31, No. 4, pp. 539–552, 1991; and the U.S. patent to Delio entitled "Method of Controlling Chatter in a Machine Tool," U.S. Pat. No. 5,170,358.

Figure 1:
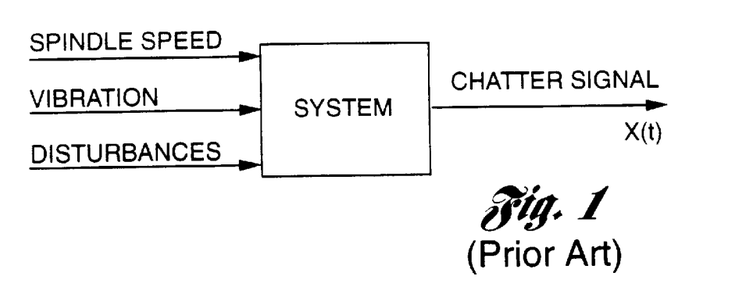
FIG. 1 is a single block illustrating chatter signal generation of the prior art.

The presence and evolution of chatter can be monitored by measuring the vibration signals from the cutting tool using appropriately placed accelerometers. Such a signal is called the "chatter signal." The chatter signal can be analyzed to discern the state of the machining process. A conceptual model of the chatter signal generation is shown in FIG. 1. As is clear, the chatter signal, X(t), will be a complicated random signal.

The three approaches to manufacturing operations of relevance to chatter phenomenon can be categorized as (1) Prevent Approach (leads to conservative operational ratings and resultant low throughput); (2) Detect and Control Approach (leads to reworking or scrapping workpieces and resultant low quality and throughput); and (3) Predict and Prevent Approach (leads to optimal high operational ratings and resultant high quality and high throughput).

SUMMARY OF THE INVENTION

An object of the present invention is to provide a relatively simple and inexpensive method and system for predicting limit cycle oscillations in a data-driven fashion.

Another object of the present invention is to provide a relatively simple and inexpensive method and system for predicting limit cycle oscillations in a data-driven fashion to obtain a classifier signal which, in turn, is utilized in a control method and system of the present invention.

Another object of the present invention is to provide a method and system for predicting limit cycle oscillations such as chatter wherein algorithms based on Teager algorithm are applied to "vibration" data to predict when the chatter phenomenon may emerge during an ongoing machining operation.

Still another object of the present invention is to provide a method and system for predicting limit cycle oscillations such as chatter wherein algorithms based on Teager algorithm are applied to "vibration" data to predict when the chatter phenomenon may emerge during an ongoing machining operation so far in advance that there is ample time to use such a prediction. Control strategies such as reduction or random variation of spindle speed to "quench" the chatter may then be employed in a control method and system of the present invention.

Yet still another object of the present invention is to provide a relatively simple and inexpensive method and system for predicting limit cycle oscillations in a machining operation to increase throughput and quality of machined workpieces.

In carrying out the above objects and other objects of the present invention, a method is provided for predicting limit cycle oscillations. The method includes the steps of generating a signal based on oscillatory behavior, statistically processing the signal to obtain a function and monitoring instantaneous changes in the function. The method also includes the step of generating a classifier signal when the instantaneous changes are more than a predetermined threshold value for a predetermined time period whereby the classifier signal is a prediction of the limit cycle oscillations.

Still further in carrying out the above objects and other objects of the present invention, a control method is also provided utilizing all of the above-noted steps and further including the step of generating an output control signal based on the classifier signal.

In the preferred embodiment, the function is the generalized Teager measure. The generalized Teager measure is a function of an estimate of the energy distribution of the signal and an inverse Fourier transform of the energy distribution of the signal.

Still further in carrying out the above objects and other objects of the present invention, systems are provided for carrying out the above-noted method steps.

The ability to predict chatter allows for simultaneously maximizing production throughput, surface finish of the workpiece and machine tool life in the industrial practice of machining process. The method and system of the present invention (also referred to as Limit Cycle Prediction Using Generalized Teager Measure (LP-GTM)) permits the prediction of chatter development over 400 milliseconds in advance, thereby providing an opportunity within the machining process to avoid chatter and the concomitant reduction of productivity and quality. Therefore, the invention described herein should find practical application in any machining process where chatter phenomenon can compromise quality and productivity.

Chatter prediction using the method and system of the present invention relies on a purely data-driven approach and does not require the knowledge of various system model parameters a-priori. Newly-developed algorithms based on Teager algorithm are applied to "vibration" data to predict when the chatter phenomenon may emerge during an on-going machining process.

Figure 2:
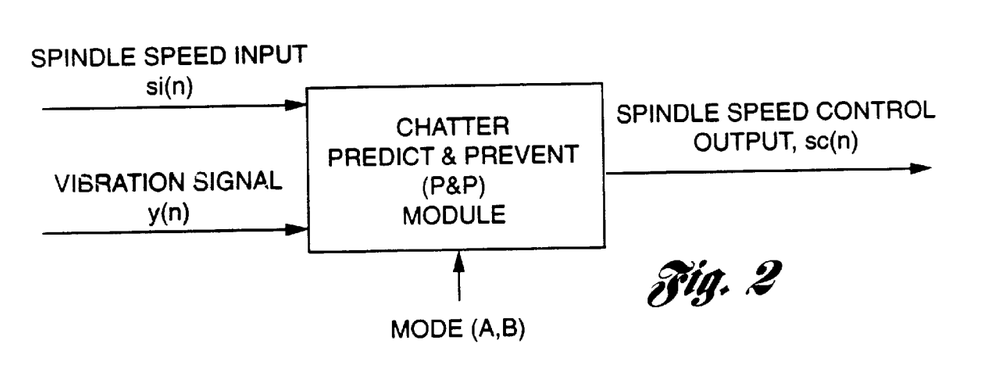
FIG. 2 is a single block illustrating output control signal generation of the method and system of the present invention wherein Mode A is the chatter-free operation for a given feed rate and spindle speed and Mode B is for maximum spindle speed with chatter-free operation for a given feed rate.
Figure 3:
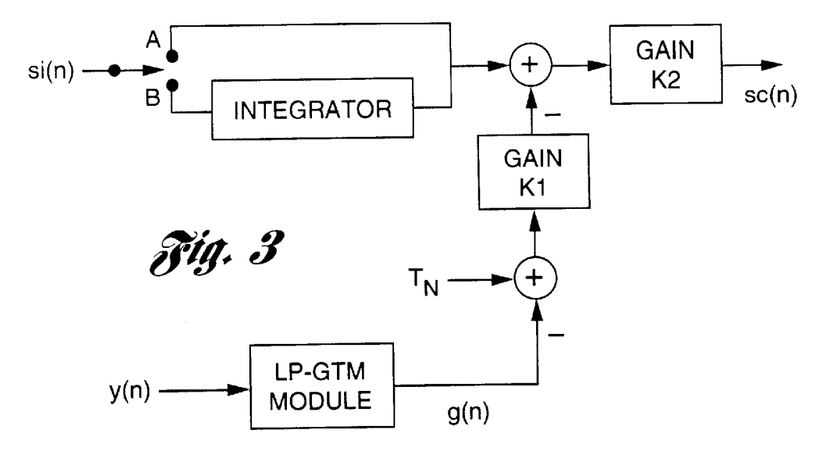
FIG. 3 is a schematic block diagram of the contents of Chatter P&P module of FIG. 2 wherein switch settings provide the Mode A or B operation.

The method and system of the present invention makes the Predict & Prevent approach of FIG. 2 possible in the manufacture of high value-added components. FIG. 3 illustrates the content of the module of FIG. 2.

Using real data collected during machining operations, it has been shown that the onset of chatter can be predicted as much as 400 milliseconds in advance. This is ample time to deploy simple automatic control strategies such as reduction or random variation of the spindle speed to prevent the chatter (rather than "quench" chatter after it has fully developed, which can be much more difficult). The spindle speed control output signal, sc(n), of FIGS. 2 and 3 provide such control.

Some of the commercial features of the method and system of the present invention are as follows:

- After some initial developmental work, the method and/or system of the present invention can be part of any new CNC machines or "retrofitted" on many existing machines.
- The potential for such a method and system in a high speed, high quality production system is obvious (i.e., increased throughput and quality). The financial impact of such an advance in the manufacture of high-value-added components such as pistons, computer disk drive parts, etc., can be significant.
- The ability to predict chatter permits a certain extra "margin of safety" in the design and manufacturing stages (for example, the quality of raw material for manufacturing can be more viable) of machine tools.
- For the same level of design and manufacturing quality, the machine tool can be operated above its usual conservative rating.

The method and system of the present invention provides machine tool chatter prediction in CNC machining systems utilizing a newly developed method called generalized Teager measure. The machine tool chatter prediction is preferably accomplished by the specific method called LP-GTM. The ability to predict chatter allows for simultaneously maximizing production throughput, surface finish of the workpiece and machine tool life in the industrial practice of machining process.

The LP-GTM method uses the a new algorithm called Generalized Teager Measure and time frequency distribution instead of the traditional methods of chatter prediction as described in Tansel, I. N. et. al, "Recognition of Chatter With Normal Networks," INT. J. MACH. TOOLS MANUFACT., Vol. 31, No. 4, pp. 539–552, 1991, to extract information from y(n), which is sampled version of X(t). The LP-GTM method can predict oncoming chatter over 400 milliseconds in advance.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 4:
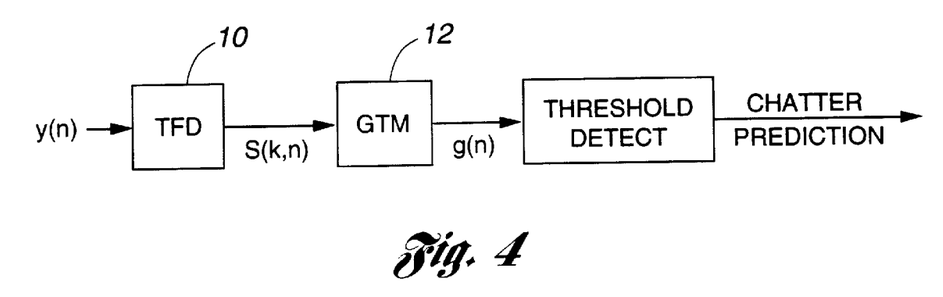
FIG. 4 is a schematic block diagram of the contents of the LP-GTM module or block of FIG. 3.

The method and system of the present invention can be best explained by defining precisely the functions of each of the blocks in FIG. 4 and specifying the proper choice of parameters therein. FIG. 4 is a detailed block diagram of the components of the LP-GTM module of FIG. 3.

TFD

The time frequency distribution (TFD) of sampled chatter signal, y(n), is calculated at block 10. Any method of TFD that produces a positive distribution can be used as discussed in Cohen L., *Time-Frequency Analysis*, Prentice Hall, N.J., 1995. A typical embodiment uses the "spectrogram", S(k,n), as the time-frequency distribution at block 10:

$$Y(k, n) = \sum_{m=0}^{N-1} y(n + m)h(m)e^{-j(2\pi km/N)}$$

$$S(k, n) = |Y(k, n)|^2$$

In the present example, the window function, h(m), is a 128-point Hanning window.

GTM (i.e., block 12)

As described in Kaiser, J. F., "On a Simple Algorithm to Calculate "Energy" of a Signal", PROC. ICASSP, vol. S7.3, pp 381–384, 1990, the Teager algorithm was introduced to calculate the "energy" of a signal. The algorithm, given below, calculates E(n) and has been shown to be related to "energy" of deterministic signals.

$$E(n) = y^2(n) - y(n-1)\,y(n+1)$$

The concept of Teager energy has been generalized in this invention so that it is applicable to random signals. More significantly, under this new generalization, this quantity is more correctly interpreted as a bandwidth measure rather than as an energy measure.

From the time-frequency distribution, by inverse Fourier transform, instantaneous autocorrelation function, r(m,n) is obtained, i.e., r(m,n)=IFT[S(k,n)] where IFT[] is the inverse Fourier transform. Generalized Teager measure (GTM), g(n), is defined as follows.

$$g(n) = \rho(o, n) - \rho(2, n) \text{ where } \rho(m, n) = \frac{r(m, n)}{r(0, n)}$$

Threshold Detection

Referring again to FIG. 3, the estimated Generalized Teager measure, g(n), is continuously monitored. If g(n) is exceeds 1.0 for more than 50 milliseconds, fully developed chatter is predicted in 100 milliseconds or later. This means that the CNC machine control system will have 100 milliseconds or more to institute chatter control measures.

Working Models

Figure 7:
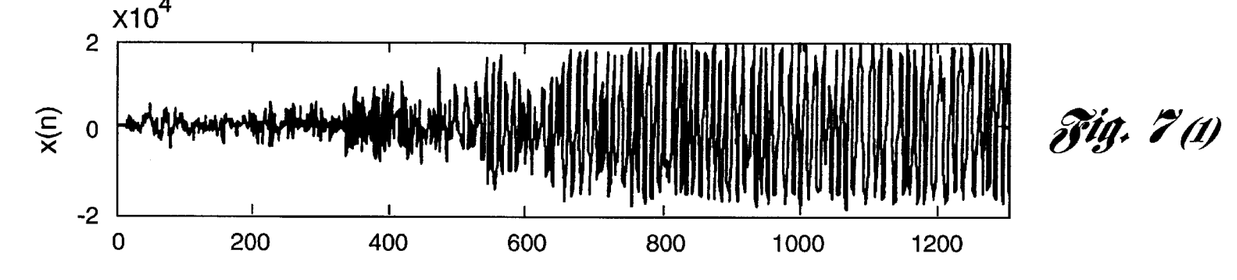
FIG. 7 are graphs during various chatter conditions: (1) pre-chatter from 0 to 300 msec; (2) chatter onset from 300 to 550 msec; and (3) fully developed chatter from 550 msec to 1.3 sec.

The LP-GTM method was tested with real data from turning process on a lathe during chatter development. Results are shown in FIGS. 7. The chatter signal, y(n) is shown on the top panel and the estimated Generalized Teager measure, g(n), in the bottom panel. The middle panel shows the estimated traditional Teager energy, E(n), for comparison purposes.

The following features are important to note in FIGS. 7:
a) When chatter is fully developed after 550 msec, g(n) value is stable at less than approximately 0.75.
b) The value of g(n) is significantly and consistently above 1.0 during pre-chatter and chatter onset conditions between 100 and 400 milliseconds. It can be concluded that the value of g(n) exceeding 1.0 is a predictor of chatter that develops fully after approximately 400 msec.
c) It is also important to note the features of the traditional Teager energy, E(n), plotted in the middle panel. Unlike g(n), E(n) has no predictive power but simply becomes of large amplitude when chatter is fully developed. Therefore, E(n) may be used as a detector of chatter but not a predictor.

Therefore, this working model demonstrates that if the chatter signal is processed as defined in FIG. 4, the value of g(n) can be monitored to observe if it exceeds 1.0. If g(n) stays above 1.0 for over 50 milliseconds, predict fully developed chatter to emerge in over 100 milliseconds.

Figure 5:
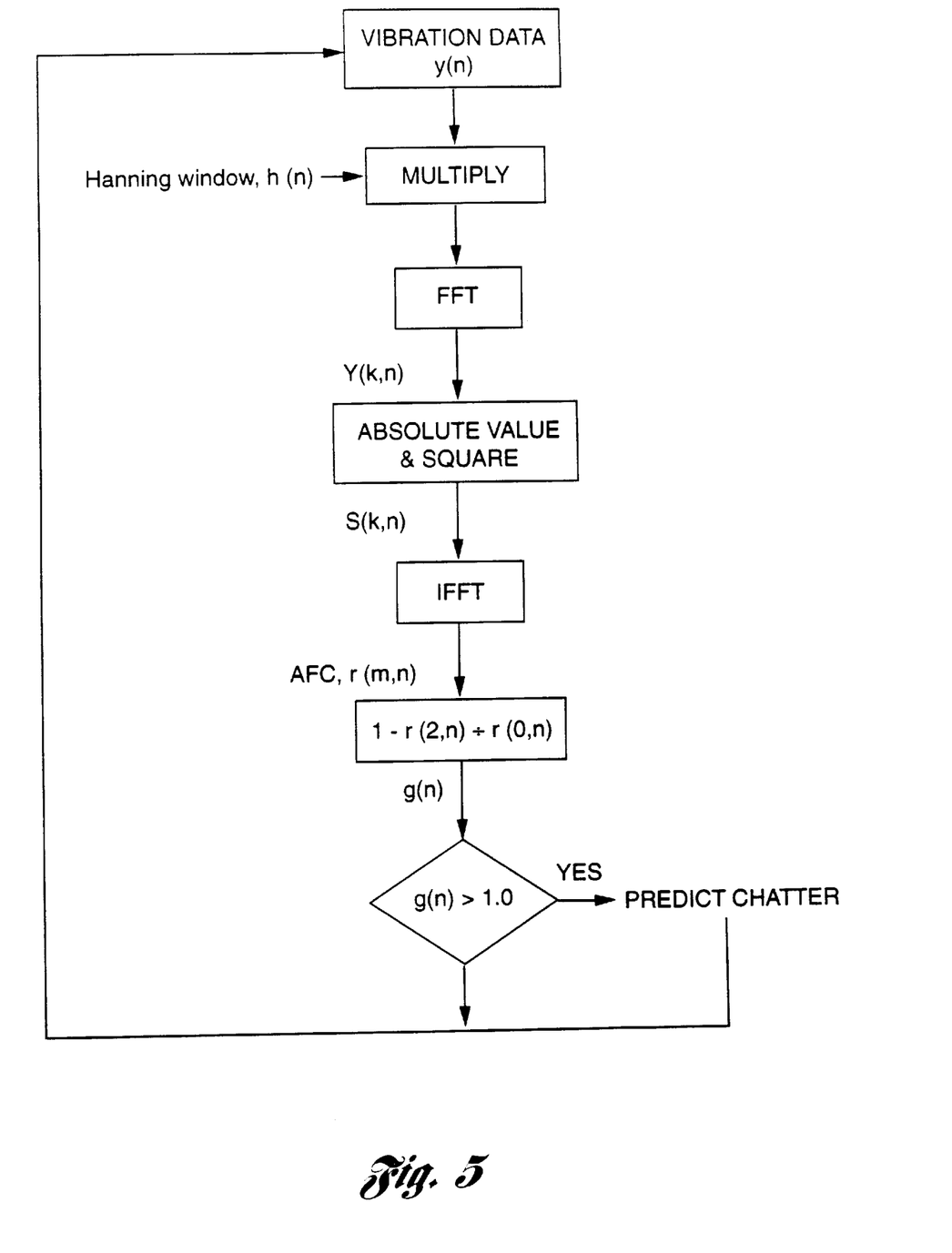
FIG. 5 is a block diagram flow chart illustrating a software implementation of the method and system of the present invention.

FIG. 5 is a block diagram flow chart of the steps performed by a properly programmed microcomputer or controller to implement the method and system of the present invention. The steps correspond to the blocks of FIG. 4 and the corresponding description thereof as noted above.

Figure 6:
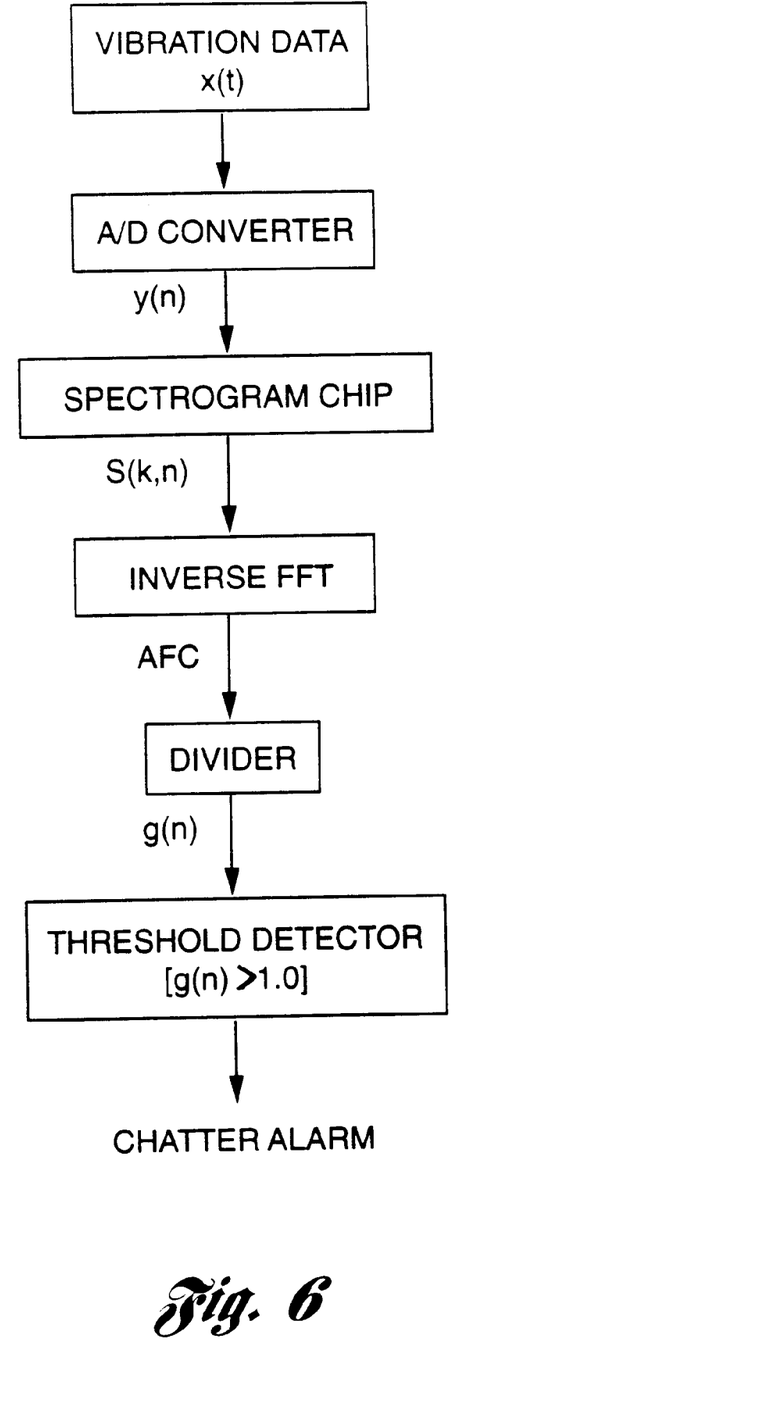
FIG. 6 is a block diagram flow chart illustrating a hardware implementation of the method and system of the present invention.

FIG. 6 is a schematic block diagram of a hardware implementation of the method and system of the present invention. The blocks of FIG. 6 also correspond to the blocks of FIG. 4 and the corresponding description thereof as noted above.

Alternative Embodiments

Many alternate methods of estimating time frequency distributions exist as described in Cohen L., *Time-Frequency Analysis*, Prentice Hall, N.J., 1995. Any of them can be used in the place of the spectrogram in block 10 in FIG. 4 as long as they yield a positive distribution.

Ramifications

The LP-GTM method can be used to predict the appearance or disappearance of limit cycle oscillations in many natural systems as noted in the Background Art of the present application.

While the best mode for carrying out the invention has been described in detail, those familiar with the art to which this invention relates will recognize various alternative designs and embodiments for practicing the invention as defined by the following claims.

What is claimed is:

1. A method for predicting limit cycle oscillations, the method comprising the steps of:
    generating a signal based on oscillatory behavior;
    statistically processing the signal to obtain a generalized Teager measure;
    monitoring instantaneous changes in the generalized Teager measure; and
    generating a classifier signal when the instantaneous changes are more than a predetermined threshold value for a predetermined time period whereby the classifier signal is a prediction of the limit cycle oscillations.

2. The method as claimed in claim 1 wherein the limit cycle oscillations are undesirable vibrations.

3. The method of claim 2 wherein the undesirable vibrations are machine tool chatter.

4. The method of claim 1 wherein the step of monitoring includes the step of estimating the generalized Teager measure of the signal and wherein the instantaneous changes are based on the time-frequency distribution.

5. The method of claim 4 wherein the time-frequency distribution is a spectrogram.

6. The method of claim 1 wherein the electrical signal is a vibration signal.

7. The method of claim 1 wherein the electrical signal is a sampled vibration signal.

8. A method for controlling limit cycle oscillations of a machine tool having a spindle, the method comprising the steps of:
    generating an electrical signal based on oscillatory behavior of the object;
    statistically processing the electrical signal to obtain a function;
    monitoring instantaneous changes in the function;
    generating a classifier signal when the instantaneous changes are more than a predetermined threshold value for a predetermined time period whereby the classifier signal is a prediction of the limit cycle oscillations; and
    generating a spindle speed control signal adapted to control the speed of the spindle of the machine tool based on the classifier signal.

9. A system for predicting limit cycle oscillations, the system comprising:
    a detector for generating a signal based on oscillatory behavior;
    a signal processor for statistically processing the signal to obtain a generalized Teager measure;
    a monitor for monitoring instantaneous changes in the generalized Teager measure; and
    a signal generator for generating a classifier signal when the instantaneous changes are more than a predetermined threshold value for a predetermined time period whereby the classifier signal is a prediction of the limit cycle oscillations.

10. The system of claim 9 wherein the limit cycle oscillations are undesirable vibrations.

11. The system of claim 10 wherein the undesirable vibrations are machine tool chatter.

12. The system of claim 9 wherein the monitor includes an estimator for estimating the generalized Teager measure of the signal and wherein the instantaneous changes are based on the time-frequency distribution.

13. The system of claim 12 wherein the time-frequency distribution is a spectrogram.

14. The system of claim 9 wherein the electrical signal is a vibration signal.

15. The system of claim 9 wherein the electrical signal is a sampled vibration signal.

16. A system for controlling limit cycle oscillations of a machine tool having a spindle, the system comprising:

a detector for generating an electrical signal based on oscillatory behavior of the object;

a signal processor for statistically processing the electrical signal to obtain a function;

a monitor for monitoring instantaneous changes in the function;

a first signal generator means for generating a classifier signal when the instantaneous changes are more than a predetermined threshold value for a predetermined time period whereby the classifier signal is a prediction of the limit cycle oscillations; and a second signal generator for generating a spindle speed control signal adapted to control the spindle of the machine tool based on the classifier signal.

* * * * *